United States Patent [19]

Otto et al.

[11] Patent Number: 4,754,373

[45] Date of Patent: Jun. 28, 1988

[54] AUTOMOTIVE HEADLAMP

[75] Inventors: Lee W. Otto, Pepper Pike; Walter J. Kosmatka, South Euclid; Frank E. Zalar, Euclid, all of Ohio

[73] Assignee: General Electric Company, Schenectady, N.Y.

[21] Appl. No.: 918,408

[22] Filed: Oct. 14, 1986

[51] Int. Cl.[4] .............................................. B60Q 1/00

[52] U.S. Cl. ...................................... 362/61; 362/263; 362/294; 362/296; 362/267

[58] Field of Search ........................ 313/579, 113, 318; 362/217, 218, 223, 84, 267, 294, 263, 61, 211, 296, 310

[56] References Cited

U.S. PATENT DOCUMENTS

| | | | |
|---|---|---|---|
| 3,453,476 | 7/1969 | English | 313/579 |
| 4,029,985 | 6/1977 | Rachel | 313/115 |
| 4,210,841 | 7/1980 | Vodicka et al. | 313/221 |
| 4,360,756 | 11/1982 | Spencer et al. | 313/579 X |
| 4,524,302 | 6/1985 | Berlec | 313/579 |
| 4,535,269 | 8/1985 | Tschetter et al. | 313/579 |
| 4,580,199 | 4/1986 | Wurster et al. | 362/211 |
| 4,642,514 | 2/1987 | English et al. | 313/111 |

*Primary Examiner*—Margaret A. Focarino

*Attorney, Agent, or Firm*—John P. McMahon; Philip L. Schlamp; Fred Jacob

[57] ABSTRACT

An improved vehicle headlamp for developing forward illumination and having reduced dimensions relative to prior art headlamps is disclosed. The lamp comprises an enclosed concave parabolic reflector of a rectangular cross section type and having a single tungsten-halogen light source coaxially located within the enclosed reflector. The headlamp has a glare shield arranged around the light source when the headlamp is utilized for low beam application and a heat shield located about the light source for both low and high beam applications. The light source is of a tubular shape and has a bulbous portion preferably of an ellipsoidal shape. The efficacy of the light source is improved by means of an infrared reflective coating placed on its outer surface.

12 Claims, 3 Drawing Sheets

AUTOMOTIVE HEADLAMP

BACKGROUND OF THE INVENTION

This invention relates to an improved vehicle headlamp comprising a concave parabolic enclosed reflector having internal reflective surfaces and a single filament light source of a tubular shape which cooperates with the reflector to develop forward illumination that is substantially devoid of uncontrolled light.

The present invention is primarily related to motor vehicle headlamps utilized to accommodate the aerodynamic styling of automobiles. In certain types of related headlamps, the geometry, such as the slope angle, is altered or reduced, relative to typical seal-beam headlamps, so that hood lines of the vehicle may be modified allowing contouring of the front end of the vehicle in order to reduce aerodynamically induced drag. Such headlamps are rectangular in shape and may incorporate relatively complex geometric parameters into the reflector and or lens of the headlamp for improving the optical performance of the headlamp which allows for modification of the styling of the vehicle while at the same time providing the frontward illumination needs of the vehicle. This improved reflector-lens combination is relatively expensive and as such becomes an integral part of the vehicle with its tungsten-halogen light source being of a replaceable type. While this rectangular automotive headlamp serves its desired function, it does present certain disadvantages primarily related to the cost of replacement. If such a headlamp, in particular the reflector or lens, becomes damaged because of a stone impact or by a related automotive collision, the owner of the automobile must, in certain cases, seek replacement from the automotive dealer of the particular brand of related automobiles rather than have the less expensive option of obtaining a replacement from retail outlets. In order to avoid such costly replacement cost, it is desired that a one-piece replaceable sealed beam headlamp be provided which satisfies the need for aerodynamic styling of automobiles.

The presently available conventional one-piece sealed beam rectangular headlamps, lacking in the geometry adaptable to allow contouring of the front end of the vehicle, and which comprise non-replaceable tungsten-halogen light sources have practical limits with regards to their frontal physical dimensions in order to provide at least the minimum frontward illumination requirements for the automobile. The limited dimensions relative to the frontal area of an automobile of currently available rectangular sealed beam headlamps which satisfy federal highway standards are 92 mm (height) by 150 mm (width). The dimension of the reflector and tungsten-halogen light source of these conventional headlamps are interrelated in that in order to provide the required illumination for the automobile, the light emitted by the light source must be efficiently intercepted and reflected by the reflector. The optical parameters (shape and geometric dimensions) of the reflector must be selected in accordance with the parameters of the light source (size and lumen output) so as to provide a beam pattern from the headlamp that is of a sufficient amount of directed light while at the same time limiting the amount of uncontrolled light. Additional practical reductions in the physical dimensions of the existing rectangular headlamp are primarily limited by the geometry of the filament, the bulb size and the material of the tungsten-halogen light source.

Current rectangular headlamps commonly utilize a tungsten-halogen light source that comprises a single-ended cylindrical envelope comprised of a glass material and lodging one or two filaments along with containing a halogen compound. The diameter, typically in the range of 10 to 15 mm, of the glass envelope must be of a selected and sufficient value so that during its operation it provides the desired housing to allow for the proper chemical reaction of its confined halogen compound, but at the same time to limit the operating temperature below the failure point of the glass envelope. If the operating temperature of the glass envelope is exceeded, the envelope will be damaged and thereby rendering the automotive headlamp inoperative. It is desired that the dimensions of the light source be reduced so that the dimensions of the conventional sealed beam rectangular headlamp may also be reduced. It is further desired that the characteristics of the envelope of the tungsten-halogen light source be improved so as to yield further reductions in the dimension of the reflector. Further, it is desired that the optical characteristics of the light source be improved so as to enhance the optical performance of the rectangular headlamp. Still further, it is desired that the efficacy or lumens/watt of the light source be improved so as to correspondingly improve the efficacy of the headlamp. It is desired that all of the improvements be accomplished so that the yielded rectangular headlamp having reduced physical dimensions and reduced power requirements provides the frontward illumination needs of the automobile.

Accordingly, it is an object of the present invention to provide a rectangular vehicle headlamp having reduced physical dimensions primarily yielded by a tungsten-halogen light source having reduced dimensions.

It is another object of the present invention to provide a tungsten-halogen light source having improved optical and operational characteristics along with reduced power requirements that contribute to enhancing the optical and operational characteristics of the rectangular headlamp.

SUMMARY OF THE INVENTION

The present invention is directed to a vehicle headlamp comprised of a tungsten-halogen light source having physical and operational parameters that allow for a reduction of the frontal physical dimensions of a reflector, preferably of a rectangular shape, with which the light source cooperates to develop forward illumination substantially devoid of uncontrolled light. The improved headlamp comprises a concave parabolic enclosed reflector having internal reflective surfaces and a single filament light source located and coaxially aligned within the enclosed reflector by means of support members. The light source is of a double-ended type and is comprised of an envelope having a centrally located bulbous portion and an elongated tubular section at each of its opposite ends. The bulbous portion has positioned therein a single filament and contains a halogen compound along with a fill-gas which is above atmospheric.

The bulbous portion may be of elliptical shape to improve the optical performance of the light source along with that of the headlamp. Further the light source may have an infrared (IR) reflective coating covering its outer surface which increases the efficacy of the light source along with that of the headlamp.

The light source allows for the reduction of the frontal physical dimensions of the headlamp relative to prior art headlamps by a factor of about 40%.

DETAILED DESCRIPTION OF THE PREFERRED EMBODIMENTS

Figure 1:
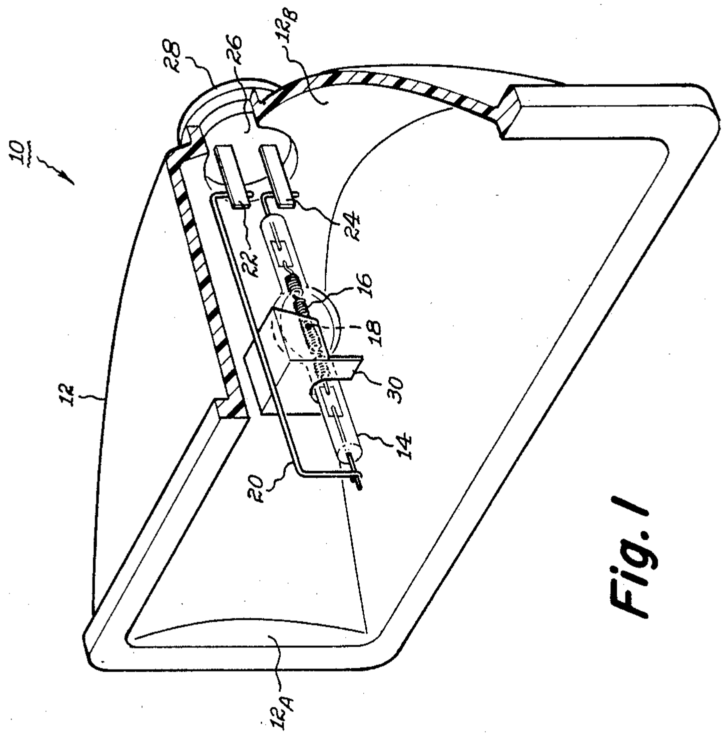
FIG. 1 is a front perspective view partially cut-away of a reflector housing a light source in accordance with the present invention.

FIG. 1 is a front perspective, partially cut-away, view of the improved vehicle headlamp 10 of the present invention. The lamp 10 has a reflector 12 which is generally rectangular in cross section and has a central parabolic cavity with generally flat top and bottom sections which are substantially parallel to each other. The reflector has a front or face portion $\mathbf{12}_A$ and a back or rear portion $\mathbf{12}_B$. The reflector is enclosed by a light-transmissive mated, and preferably sealed to lens (not shown) its front portion $\mathbf{12}_A$.

The reflector may be comprised of material selected from the group consisting of plastic and glass. The headlamp of such a reflector comprised of plastic or glass is preferably a two-piece member with one of the member being the lens formed of the same material as the reflector and sealed or joined to the front portion of the reflector. If desired, the reflector and lens of the headlamp may both be of a plastic material so as to be similar to plastic headlamp disclosed in U.S. Pat. No. 4,210,841 of Vodicka et al. issued July 1, 1980, having a heat shield located above the light source and which is herein incorporated by reference.

The lamp 10 further comprises a double-ended light source 14 having a single filament 16 with its midsection 18 located and coaxially aligned within the enclosed reflector 12. For the embodiment shown in FIG. 1, the alignment of the light source is accomplished by support means comprising support and electrical members 20, 22 and 24. The member 20 has one end connected to the inlead of the filament of the light source 14 and its other end connected to member 22 located within and positioned at the rear $\mathbf{12}_B$ central portion of the reflector 12. The other inlead of the filament of the light source 14 is connected to member 24, similar to member 22, and positioned at the rear $\mathbf{12}_B$ central portion of the reflector. The members 22 and 24 extend through a sealed or potted region 26 and are electrically connected to an receptacle means 28 (not fully shown) which supplies the required excitation for headlamp in accordance with the needs of the automobile in which the lamp 10 is housed.

The lamp 10 serves as either the high or low beam illumination source for the automobile. For low beam applications, it is preferred that a glare light shield 30 connected to support member 20 by appropriate means be positioned and arranged about the bulbous portion of the light source 14 facing the front of the reflector. The glare light shield 30 substantially prevents the light emitted by the filament which does not encounter any parabolic portions of the reflector from otherwise escaping through the lens in an uncontrolled manner. The glare shield is a thin metal member which substantially eliminates the direct filament images from being transmitted by the headlamp 10. The glare light shield 30 may be such as that disclosed in U.S. Pat. No. 4,029,985 of Rachel issued June 14, 1977 and which is herein incorporated by reference. Further, for low beam or high beam application, the midsection 18 of the filament is predeterminately disposed with respect to the focal point of the reflector.

For high beam applications, the glare shield is not necessary, but the previously mentioned heat shield of U.S. Pat. No. 4,210,841 is desired for diffusing the convected heat within the headlamps so as to reduce the hot spots related to the adhesives of the headlamps.

Figure 2:
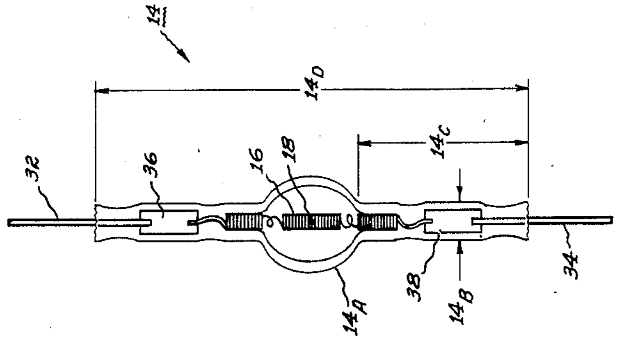
FIG. 2 is an illustration of the light source of the present invention.

Further details of the light source 14 are shown in FIG. 2. The light source 14, shown in a slightly enlarged manner, is a double-ended type and has inleads 32 and 34 (connected to members 20 and 24 of FIG. 1) located at respectively sealed opposite ends of light source 14 and respectively connected to electrical means such as foil members 36 and 38. The other ends of the foil members 36 and 38 are connected by appropriate means to opposite ends of the filament 16. The filament 16 has parameters, such as wire diameters and coil windings, selected so as to be effective for operation with a voltage of about 12.8 and provide an operating wattage in the range of about 35 to about 70 watts.

The light source 14 has a bulbous portion $\mathbf{14}_A$ having positioned therein the filament 16 and containing a halogen compound along with a fill-gas which is above atmospheric.

The envelope of the light source 14 is preferably comprised of a quartz material which allows for an increased operating wall temperature relative to a typical light source comprised of glass. The quartz light source 14 is operated with increased wall temperature and increased internal pressure both contributing to improving the efficacy or lumens/watt relative to prior art light sources formed of glass. The quartz, tubular light source 14 has decreased bulb size and length, relative to prior art glass light sources, which yield the optical benefits to be more fully disclosed hereinafter.

The tubular light source may have a reflective coating covering its outer surface. The characteristics of reflective coating are preferably selected so as to intercept and reflect the infrared portion of the electromagnetic spectrum of the light emitted by the filament 16 back toward the filament. This reflected infrared energy increases the operating temperature of the filament without providing any increases in the excitation supplied by the automobile to the filament. The increased operating temperature of the filament correspondingly increases the efficacy of the light source which also thereby improves the performance of the headlamp 10. This improved performance of lamp 10 allows for reduction in the electrical capabilities such as the amperage rating of the electrical system of the automobile. The reduced power requirement for the headlamp 10 facilitates weight reductions of the automotive electrical system, which in turn yields improved fuel efficiency.

The light source 14, shown in FIG. 2, comprises an envelope having the centrally located bulbous portion $14_A$ and elongated straight-like tubular sealed sections $14_B$ at each of its ends. The elongated sealed sections have an outer diameter which is substantially less than the average diameter of bulbous portion. The envelope of the light source 14 has typical dimensions of the bulbous portion $14_A$ with a outer diameter of about 6 mm to about 10 mm, the sealed sections $14_B$ at each of its ends having a thickness of about 3 mm to about 6 mm and a length $14_C$ of about 8 mm to about 14 mm, and an overall length $14_D$ of about 25 mm to about 45 mm. The bulbous portion $14_A$ is preferably of an elliptical shape. The dimensions of the double-ended light source 14 along with the elliptical shaped bulbous portion $14_A$ are of importance to the present invention and may be more fully appreciated by first referring to prior art light sources such as those disclosed in the "BACKGROUND" section.

Prior art light-sources of the tungsten-halogen type have a cylindrical inner envelope formed of a glass material with an outer diameter of about 10 mm to about 15 mm, and are the commonly known as single-ended devices. Single-ended light sources have a pinch area at one of its ends with a typical length of about 5 mm to about 10 mm and a typical thickness of about 4 mm to about 6 mm. Some of the benefits related to the present invention of the double-ended light source having an elliptical shaped bulbous portion $14_A$ relative to single-ended light source may now be described with reference to FIGS. 3(*a*) and 3(*b*).

Figure 3B:
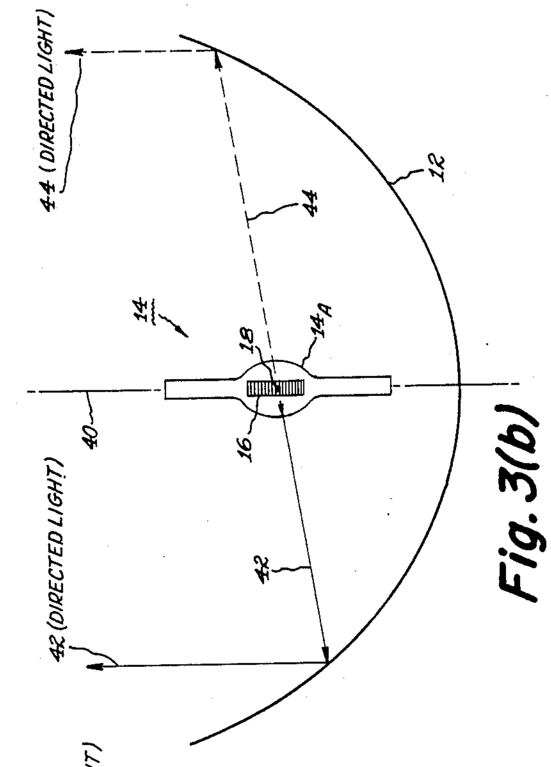
FIGS. 3(*a*) and 3(*b*) are schematic views comparatively and respectively illustrating a portion of the light control of a single-ended prior art light source and the improved light control of the double-ended light source of the present invention yielded by a preferably shaped elliptical bulbous portion.
Figure 3A:
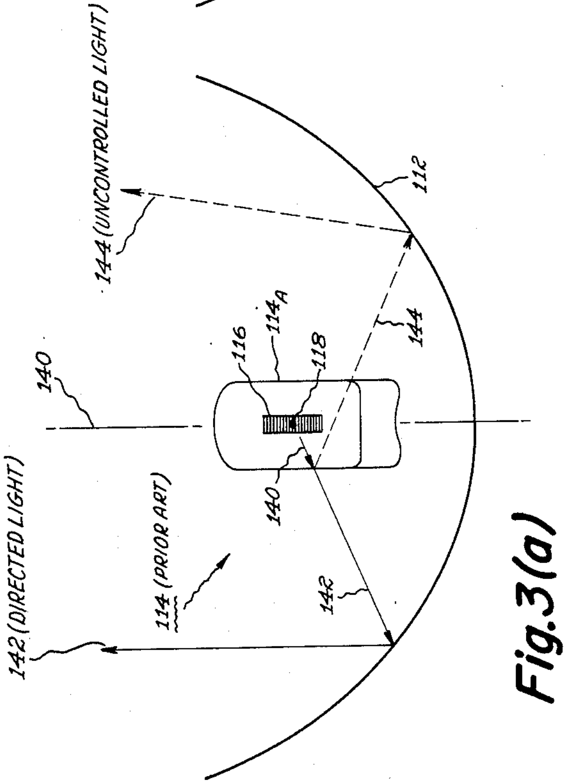

FIGS. 3(*a*) and 3(*b*) are schematics used to illustrate a comparison between the cylindrical single-ended prior art light source 114 (FIG. 3(*a*)) and the tubular light source 14 (FIG. 3(*b*)) having an elliptical shape bulbous portion $14_A$. The single-ended light source 114 is shown in FIG. 3(*a*) without any filament support and electrical members and is located relative to its related reflector 112 of its headlamp. Similarly, the double-ended tubular light source 14 is shown in FIG. 3(*b*) without its filament members and is located relative to its related reflector 12 of its headlamp 10. The tubular light source 14 has the midsection 18 of its filament 16 predeterminately and coaxially disposed relative to the focal point and along the optical axis 40 of the reflector 12. Similarly, the single-ended light source 114 has the midsection 118 of its filament 116 predeterminately and coaxially disposed relative to the focal point and along the optical axis 140 of its reflector 112. The tubular light source 14 having a preferably shaped elliptical bulbous portion $14_A$ reduces the secondary reflections related to the filament relative to the single-ended light source 114 and such reduction may be described with reference to FIG. 3(*a*).

The filament 116 emits a primary light rays representatively shown as light ray 142 which is substantially transmitted out of the light source 114, encounters and is advantageously reflected by the parabolically shaped reflector 112. The parabolically shaped reflector causes the light ray 142 to be reflected at the same angle at which it arrives and therefore light ray 140 is reflected essentially parallel to the optical axis 140 and into the directed or desired light beam of the headlamp. A portion of the primary light ray 142, approximately 8% to 10%, that encounters the cylindrical walls of the light source 114 is disadvantageously reflected by light source 114 away from its prescribed path and is shown in phantom as a secondary reflection 144. The secondary reflection 144 emanate from the light source 114 in such a direction as not to pass through or near the area occupied by the filament 116 and result in a commonly termed "secondary filament image" (off focus) reflection. The secondary reflection 144 is diverted and distorted from its prescribed path by light source 114 downward at an undesirable angle toward reflector 112 which intercepts and reflects it at an undesired angle and in a non-parallel manner relative to the optical axis 140. The light ray 144 is transmitted from the headlamp as a uncontrolled light ray 144. This uncontrolled light ray 144 typically represents approximately 8% to 10% of the light beam output.

The secondary reflections related to light source 14 are substantially reduced or even eliminated by the elliptical bulbous portion $14_A$. The filament 16 is centrally positioned along the major axis of the substantially elliptical bulbous portion $14_A$ and also occupies fully the distance between the foci of the elliptical bulbous portion. The filament 16 emits a primary light ray 42 which is transmitted out of the light source and advantageous reflected by reflector 12 essentially parallel to the optical axis 40 as directed light 42 in a manner similar to that described for primary ray 142 of light source 114. However, the secondary reflections 44, shown in phantom in FIG. 3(*b*), related to the primary ray 42 encountering the elliptical bulbous portion $14_A$ are reflected back so as to pass through the area of the filament and are thus indistinguishable from light directly emanating from the filament. The secondary reflection 44 encounter the parabolically shaped reflector 12 which reflect light ray 44 essentially parallel to the optical axis 40 as directed light 44. The elliptical bulbous $14_A$ in addition to improving the optical performance of light source 14 having reduced secondary reflection of a factor of approximately 8% to 10%, is also beneficial to the operation of the light source 14 having an infrared reflective coating. The benefits of an elliptical shaped inner envelope having an infrared coating on its outer surface are described in U.S. Pat. No. 4,535,269 of Tschetter et al. to which reference may be made for further details.

Figure 4B:
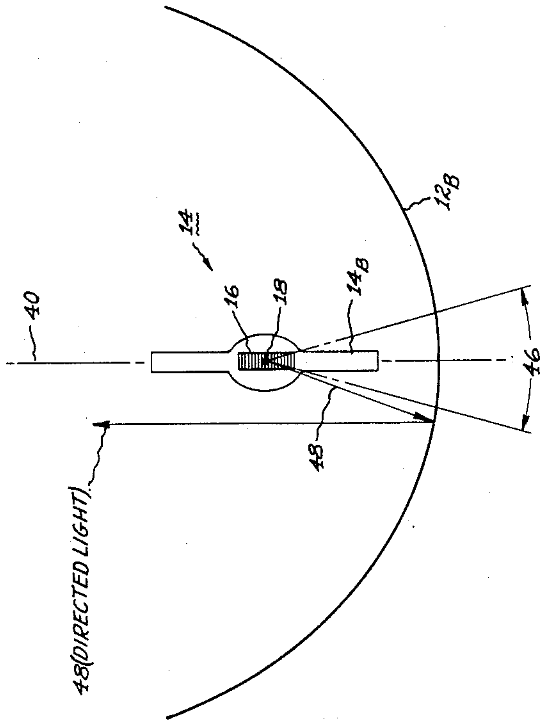
FIGS. 4(*a*) and 4(*b*) are schematic views comparatively and respectively illustrating a portion of the light control of the cylindrical single-ended prior art light source and the improved light control of the double-ended light source of the present invention yielded by having reduced pinch regions relative to the prior art devices.
Figure 4A:
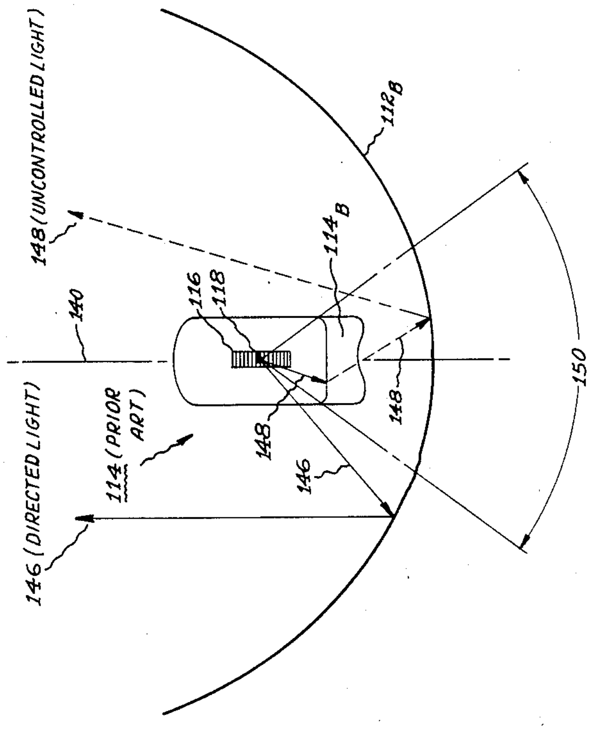

Additional comparative benefits of double-ended light source 14 relative to single-ended light source 114 are concerned with the interreaction of the pinch region of each light source as related to the rear portion of their respective reflector. FIGS. 4(*a*) and 4(*b*), similar to FIGS. 3(*a*) and 3)*b*), are schematics used to illustrate a comparison of optical considerations between the light source 114 (FIG. 4(*a*)) having a pinch section $114_B$ and the light source 14 (FIG. 4(*b*)) having the pinch section $14_B$.

The tubular light source 14 has the pinch section $14_B$ of one of its end located between the filament 16 and positioned toward and near the rear portion $12_B$ of reflector 12. The cylindrical single-ended light source 114 has its pinch portion $114_B$ located between the filament 116 and positioned toward and near the rear portion $112_B$.

The desired operation related to light source 114 may be described with reference to light ray 146. The light ray 146 when emitted from the filament 116 does not encounter pinch section $114_B$ and impinges the parabolically shaped reflector rear portion $112_B$, which in a manner as previously described for light ray 142, reflects light ray 146 as directed light.

The undesired or disadvantage of light source 114 may be described with reference to light ray 148 which is emitted by the filament 116 but encounters the pinch section $114_B$ of the light source 114. The pinch section $114_B$ causes the light ray 148 to be diverted and distorted from its intended, prescribed path, downward at an undesirable angle toward the reflective surface $112_B$. The distorted light ray 148 impinges and is reflected by the reflective surface $112_B$ in an undesired, non-parallel, manner relative to optical axis 140 as light ray 148 which forms part of the upwardly directed uncontrolled light 148 of the light beam transmitted by the prior art headlamp. All of the light rays emitted by the filament 116 that undesirably encounter the pinch portion $114_B$ are shown as contained within a zone 150 which is formed in FIG. 4(*a*) by phantom lines drawn from the midsection 118 of the filament 116 to each edge of pinch region $114_B$ and then terminating at the rear portion $112_B$.

The light source 14 of FIG. 4(*b*) having the sealed portion $14_B$ also produces a undesired zone of light 46 similar to zone of light 150; however, the dimensions of sealed section $14_B$ are substantially less than those of sealed section $114_B$, and accordingly, the zone 46 of FIG. 4(*b*) is substantially less than zone 150 as shown in FIG. 4(*a*). The optical benefits yielded by the light source 14 having a reduced pinch section $14_B$ relative to the prior art pinch section $114_B$ may be described with the reference to light ray 48. Light ray 48 emitted by the filament 16, which would be within the confines of section 114 if present, is intercepted and reflected by the parabolically shaped reflective portion $12_B$ into the directed light 48 of the lamp 10. The light ray 48 being in the directed beam pattern of lamp 10 is representative of the benefits yielded by the headlamp of the present invention over prior art headlamps.

The section of the rear portion $12_B$ related to the undesired zone 46 and the section of the rear portion $112_B$ related to the undesired zone 150 develop uncontrolled, spread, fill or glare light that does not contribute to the desired, directed, main or beneficial portion of the light beam of the automobile headlamp. To compensate for this loss in beneficial reflective surfaces, the remainder of the headlamp is provided with sufficient reflective surfaces so that the reflector may be able to provide enough frontward illumination to meet the needs of the automobile.

A comparison between light zone 150 (prior art) and 46 (lamp 10) reveals that the present invention lamp 10 has substantially less uncontrolled light producing reflective surfaces relative to prior art headlamps. The effect of this reduction of uncontrolled light producing surfaces is that the overall dimensions, especially the frontal dimensions, of the lamp IO of the present invention may be reduced relative to prior art headlamps while still developing frontward illumination that meets and even exceeds the needs of the automobile.

In the practice of the present invention two headlamps, one employing a light source 14 having an elliptical bulbous portion along with an infrared (IR) reflecting coating, and the other having an elliptical bulbous portion but lacking an IR coating, were experimentally fabricated and tested in order to determine if these devices satisfied the automobile illumination requirements as specified in the federal vehicle safety standards. The tested fabricated headlamps exceeded the illumination needs of the automobile.

Such fabricated headlamps was substantially rectangular in shape and had overall frontal dimensions of 60 mm (height) by 135 mm (width). The fabricated headlamps also had a depth of 83 mm. These headlamps provide a reduction in size of the frontal dimensions of about 40% relative to prior art rectangular headlamps discussed in the "Background" section having frontal dimensions of 92 mm (height) by 150 mm (width).

It will now be appreciated that the practice of the present invention provides for a automobile headlamps having reduced physical dimensions primarily provided by the quartz, tubular light source 14 of the present invention coaxially aligned within the reflector and having reduced pinch sections relative to prior art cylindrical glass light sources. These improved automobile headlamps also provide reduced uncontrolled light relative to prior art headlamps.

It will be further appreciated that the optical performance of the tubular light source 14 may be further enhanced by having an elliptical bulbous portion. Further the operational characteristics of the light source may be improved by providing an infrared (IR) reflective coating covering its outer surfaces which reflects unneeded infrared light emitted by the filament back toward the filament to increase the operating temperature of the filament and improve efficacy of the light source, and therefore the overall efficacy of the headlamp 10 of the present invention which also allows for a reduction in the power requirements of the automobile to yield improved fuel efficiency.

What we claim as new and desire to secure by Letters Patent of the United States is:

1. An improved vehicle headlamp for providing forward illumination comprising:

a reflector having a generally rectangular cross section, a parabolic central cavity with internal reflective surfaces and generally flat top and bottom sections which are substantially parallel to each other;

a light-transmissive lens mated to and closing the front section of said reflector;

receptacle means disposed at the rear of said reflector and having electrical members extending into said cavity; and a light source comprising an envelope having a centrally located bulbous portion with an ellipsoidal shape and an elongated straight-like tubular section at each of its opposite ends, said elongated sections having an outer diameter which is substantially less than the average diameter of said bulbous portion, said bulbous portion having positioned therein a filament and containing a halogen compound along with a fill-gas which is above atmospheric; said filament being connected between electrical means extending through and respectively sealed within said opposed elongated sections, one of said electrical means of said filament being connected to one of said electrical members of receptacle means and the other said electrical means of said filament having means for connecting to the other of said electrical members of said receptacle means; said light source being connected to and arranged by support means so that the midsection of its filament is coaxially aligned within said reflector and one of its opposed sealed elongated sections is positioned toward and near the rear of said reflector.

2. An improved vehicle headlamp according to claim 1 wherein said reflector is of a material selected from the group consisting of plastic and glass.

3. An improved vehicle headlamp according to claim 2 wherein said reflector and said lens are formed of glass.

4. An improved vehicle headlamp according to claim 2 wherein said reflector and said lens are formed of plastic.

5. An improved vehicle headlamp according to claim 1 wherein the rectangular headlamp has frontal physical dimensions of about 60 mm in height and about 135 mm in width.

6. An improved vehicle headlamp according to claim 1 wherein said envelope of said light source has a reflective coating covering its outer surfaces.

7. An improved vehicle headlamp according to claim 6 wherein said coating is selected so as to reflect the infrared portion of the electromagnetic spectrum.

8. An improved vehicle headlamp according to claim 1 wherein said light source is comprised of quartz.

9. An improved vehicle headlamp according to claim 1 wherein said filament has parameters effective for operation with a voltage of about 12.8 volts and at a wattage rating in the range from about 35 watts to about 70 watts.

10. An improved vehicle headlamp according to claim 1 wherein said filament has its midsection predeterminately disposed with respect to the focal point of said reflector and along the optical axis of said reflector.

11. An improved vehicle headlamp according to claim 10 further comprising a glare shield connected to said support means and positioned about a portion of the bulbous portion of the light source which is toward the front section of the reflector.

12. An improved vehicle headlamp according to claim 11 further comprising a heat shield located above the light source.

* * * * *